United States Patent [19]

Rouse

[11] Patent Number: 5,033,874
[45] Date of Patent: Jul. 23, 1991

[54] COVER ELEMENT FOR A BEARING

[75] Inventor: William Rouse, Saskatchewan, Canada

[73] Assignee: William W. Yarnton, Regina, Canada; a part interest

[21] Appl. No.: 515,613

[22] Filed: Apr. 27, 1990

[51] Int. Cl.⁵ .............................................. F16C 33/76
[52] U.S. Cl. .................................................... 384/477
[58] Field of Search ............... 384/477, 130, 488, 537, 384/538, 498

[56] References Cited

U.S. PATENT DOCUMENTS

| | | | |
|---|---|---|---|
| 3,415,500 | 12/1968 | Pethis | 384/477 |
| 4,368,933 | 1/1983 | Motsch | 384/130 |
| 4,944,610 | 7/1990 | Berg | 384/130 |

Primary Examiner—Lenard A. Footland
Attorney, Agent, or Firm—Adrian D. Battison; Stanley G. Ade; Murray E. Thrift

[57] ABSTRACT

Bearings of the pillow block type are protected by a cover which extends over the pillow block and is shaped to substantially follow the contour of the pillow block and includes a slit from a lower edge of the device to an opening for allowing the shaft to pass into the cover to the opening. The cover is formed from polypropylene which is highly flexible and resistant to impact damage. Grease can be inserted into a recess or clearance between the end face of the bearing and the inside surface of the cover. In an alternative arrangement, the cover can be formed in two parts to be clamped on respective sides of plates supporting the bearing. Again there is provided a slit and a central opening to be inserted over the shaft.

16 Claims, 2 Drawing Sheets

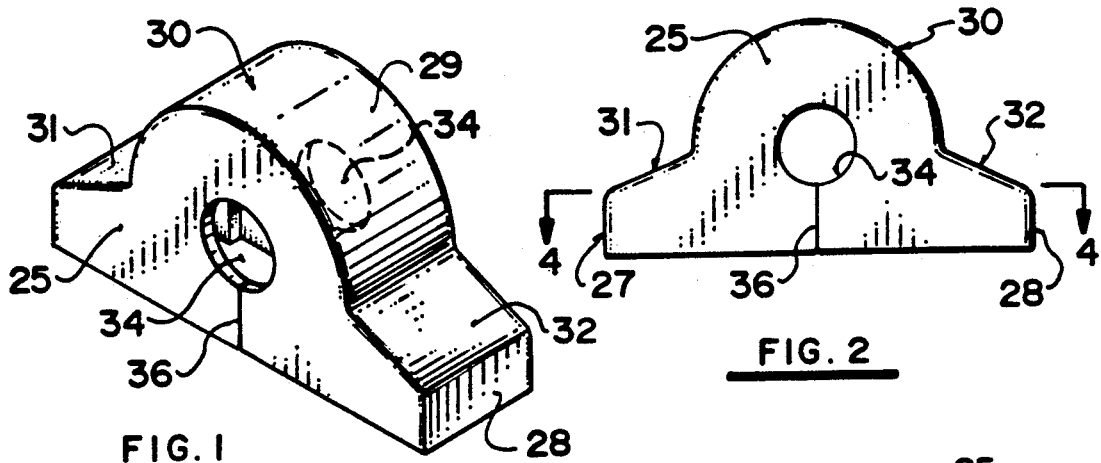
FIG. 1
FIG. 2
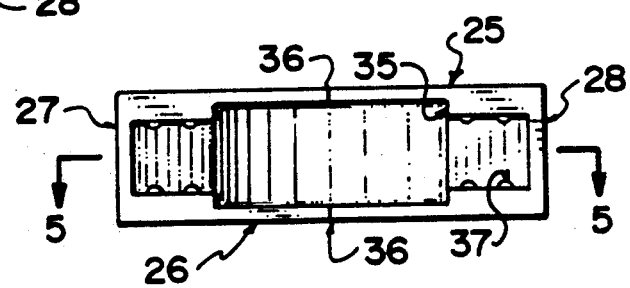
FIG. 3
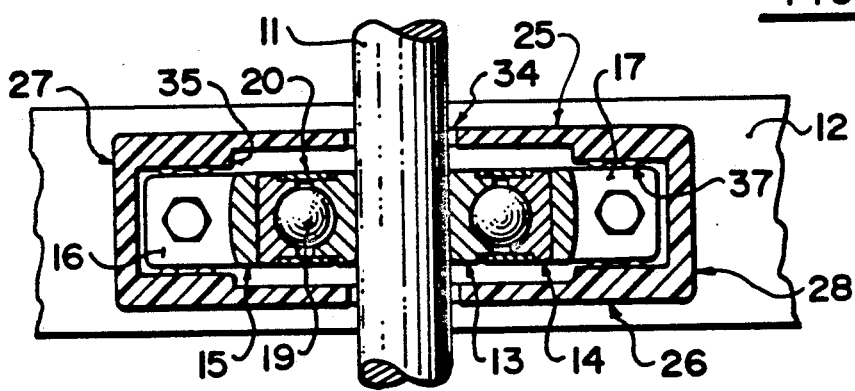
FIG. 4
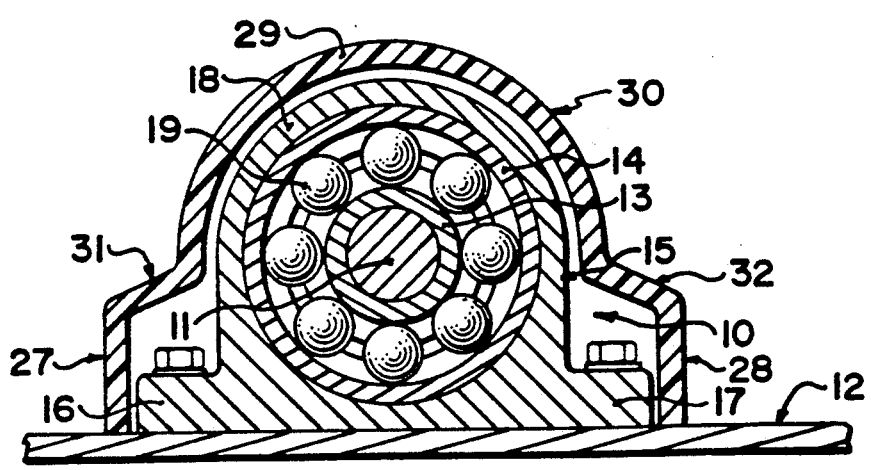
FIG. 5

COVER ELEMENT FOR A BEARING

BACKGROUND OF THE INVENTION

This invention relates to a cover element for a bearing of the type which includes an inner bearing element for engaging a rotatable shaft, an outer bearing element for mounting on a suitable support and bearing means generally in the form of balls mounted in an annular chamber between the inner and outer elements to allow friction free rotation.

Generally bearings of this type are filled with grease and are then sealed by an end plate which is fixed to one of the elements so as to bridge the end face of the annular chamber. Bearings of this type are of course very widely used in various applications and are often used in areas which are open to high levels of contamination from dust and other particulate contaminants.

Bearings of this type have a relatively high rate of failure often due to the entry of the contaminants- into the bearing itself where the contaminants increase friction and cause wear eventually leading to a breakdown of the parts and often seizure. While close attention has been given to the structure of the bearing seals, a serious problem remains which leads to regular replacement of the bearings at relatively high cost.

One problem which arises with bearings of this type is that the heating and cooling of the bearing which occur during periods of use and periods of standing can cause grease to be pumped out of the bearing and then back into the bearing as it cools with the grease returning to the bearing tending to carry contaminants into the bearing which collect on the exterior of the bearing.

Bearings of this type can be used in the following different applications;
various conveying systems;
drilling rigs, pump jackets and offshore equipment;
lifting and conveying equipment;
mining equipment;
ventilators;
motor vehicles (drive axles);
agricultural machinery;
vibrating screens and vibrators;
forest industry;
tunnelling machines;
hydraulic components;
textile machinery;
housing and bearing units;
equipment for bearing mounting and dismounting;
pressure forming of metal components;
aviation;
rail vehicles;
paper making machinery and calendars;
steel work and rolling mill equipment;

SUMMARY OF THE INVENTION

It is one object of the present invention, therefore, to provide an improved bearing and cover combination which enables an improved protection of the bearing and significantly increased life.

It is a further object of the present invention to provide a specific design of cover element which can be used in relation to pillow blocks.

It is a yet further object of the present invention to provide a specific design of cover which can be used with bearings of the type clamped between two support plates.

According to the first aspect of the invention there is provided a bearing and cover combination comprising a shaft, a support member, a bearing comprising an inner bearing element mounted on the shaft for rotation therewith, an outer bearing element having an outer peripheral surface and defining an annular chamber between the inner and outer bearing elements and having end faces of the chamber at axially facing end faces of the bearing, and bearing means mounted in the chamber for supporting the inner element relative to the outer element for rotation relative thereto, means mounting the outer bearing element in fixed position on the support element for rotation of the shaft relative to the support element and a cover element for the bearing comprising an integrally molded plastics body defining an end wall portion covering one of said end faces of said bearing and a peripheral wall portion covering the outer peripheral surface of the outer element, and means engaging the support element to hold said cover element on said bearing.

According to the second aspect of the invention there is provided a cover member for a pillow block bearing arrangement comprising an integrally molded plastics body defining a part cylindrical upper wall surrounding an axis of the bearing, a pair of parallel side faces at right angles to the axis, each side face having an opening therein concentric to the axis for receiving a shaft of the bearing arrangement, a pair of end walls spaced outwardly from the part cylindrical wall in a direction at right angles to the axis with each end wall lying in a plane parallel to the axis, a pair of upper wall portions each extending from the part cylindrical wall to a respective one of the end walls, an underside of the cover element being open to expose a hollow interior thereof for pressing over the pillow block bearing arrangement and means defining a pair of cuts each extending from the underside to a respective one of the openings.

According to a third aspect of the invention there is provided a cover member for a bearing assembly of the type comprising a first plate member and a second plate member clamped together in substantially parallel contacting relationship so as to engage an outer bearing member therebetween in a recess therein surrounding a shaft, the cover member comprising a first portion mounted on one side of one of the plate members and a second portion mounted on one side of the other of the plate members so as to clamp the plate members therebetween, each of the portions being formed of a resilient plastics material having a recess therein for engaging over the bearing a first opening at a base of the recess for surrounding the shaft, a cut extending from the first opening to one outside edge of the portion, and a plurality of second openings therethrough at spaced positions surrounding said first opening for receiving fasteners therein, each second opening having a rigid insert therein for communication of force in a direction parallel to the opening to clamp said plate members together.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is an isometric view of a cover for a pillow block bearing construction according to the present invention.

FIG. 2 is a front elevational view of the cover of FIG. 1.

FIG. 3 is an underside view of the cover of FIG. 1.

FIG. 4 is a cross-sectional view along the lines 4—4 of FIG. 2 showing also the pillow block bearing construction.

FIG. 5 is a cross-sectional view along the lines 5—5 of FIG. 3 again showing in additionally bearing construction.

In the drawings like characters of reference indicate corresponding parts in the different figures.

DETAILED DESCRIPTION

Figure 6:
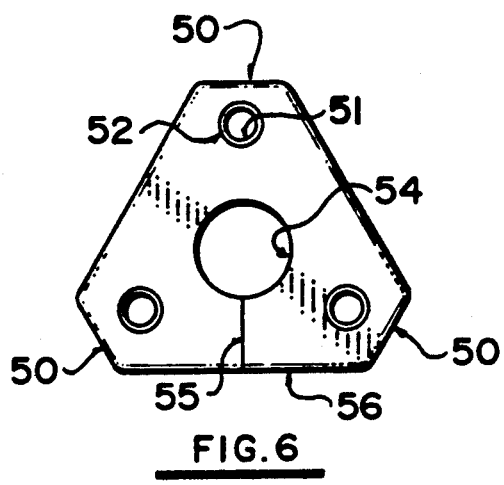
FIG. 6 is a front elevational view of one part of a second construction of cover.

A pillow block bearing is indicated in FIG. 5 generally at 10 and comprises a shaft 11 which is mounted for rotation relative to a support plate 12. The shaft 11 carries an inner bearing element 13 which is rotatable with the shaft. An outer bearing element 14 is carried in a pillow block element 15 which has an upper wall portion at least partly surrounding the outer bearing element and a pair of flanges 16 and 17 which project outwardly from an annular support portion 18.

Mounted between the inner and outer bearing elements is provided a plurality of balls 19 and for convenience of illustration the cage which supports the balls is omitted. The balls of course provide a substantially friction free rotation of the inner race or bearing element relative to the outer race thus allowing the shaft 11 to rotate relative to the support plate 12. Between the inner and outer bearing elements is provided a channel which is annular in shape and which provides the area for receiving the balls 19. The channel breaks out in either end of the bearing and is covered by a bearing seal 20 which is attached to either the inner or the outer bearing element so as to rotate relative to the other. The bearing seal is designed to retain the grease within the bearing and to prevent the entry of contamination into the bearing.

The above description of the pillow block and bearing assembly is of a conventional nature and very many examples of devices of this type are available and well used.

According to the invention there is provided a cover member shown in most detail in FIGS. 1, 2 and 3 but also it is shown mounted in place in FIGS. 4 and 5.

The cover member comprises a pair of side walls 25 and 26, a pair of end walls 27 and 28 and a covering wall 29. The covering wall defines a part cylindrical portion 30 which is arranged to extend over the upper part of the pillow block and has a curvature following the curvature of the outer surface of the pillow block. On either side of the cylindrical portion 30 is provided a pair of outwardly extending surfaces 31 and 32 which are inclined downwardly and outwardly from a lower edge of the cylindrical portion 30 to the top edge of the end wall 27, 28 respectively. As shown in FIG. 2 the side wall in elevation has a shape so that it matches the edge of the upper wall. Each of the side walls has an opening 34 provided therein of a size to receive the shaft 11 with a slight clearance between the outer surface of the shaft and the edge of the opening 34.

As shown in FIG. 3, the side walls 25 and 26 and the upper wall 29 are thin relative to the size of the cover member so as to form a hollow interior which can engage over the pillow block.

As best shown in FIG. 3 and 4, the side wall 25 and 26 includes a step 35 so as to form a thinner portion aligned with the bearing thus defining a recess or clearance between the outer face of the bearing and the inner surface of the wall 25, 26 respectively. Each of the side walls includes a slit 36 extending from the underside of the opening 34 directly downwardly to the bottom edge of the side wall. The slit is formed by hot-cutting through the body of the cover so as to form a slit without removal of any significant amount of material so that in a relaxed condition of the cover the slit is closed. Furthermore the slit is cut in a direction parallel to the axis so that the sides of the slit as best shown in FIG. 3 lie directly across the thickness of the wall at right angles to the surface of the wall. The slit thus lies in an axial plane.

The cover is formed from polypropylene of high flexibility so that it can be twisted and deformed from the rest condition shown in the drawings to a distorted condition in which the slit is fully opened by twisting of the side wall to allow the slit to pass over the shaft until the shaft enters the opening 34.

Prolypropylene of this type has a very high degree of flexibility and impact resistance even at temperatures down to −50 degrees C. The material includes a UV inhibitors which prevent damage due to sunlight action on the plastics material.

The cover also includes means thereon engaging the support element or flanges 16, 17 to hold the cover element on the bearing. More particularly, as best shown in FIG. 4, the flanges 16 and 17 often carry raised lettering 37 on the side surfaces. The step 35 allows the inside surface of the wall 25 and 26 at the position aligned with the flanges 16 and 17 to engage the side surfaces of flanges in a press-fit or friction fit thus tending to hold the lower edge of the side walls down into contact with the plate 12. This action of the press fit onto the sides of the flanges also tends to close the slit 36.

Before attachment into place on top of the conventional pillow block, the cover can have a suitable amount of grease applied into the interior of the cover so that the area between the sides of the bearing and the inside of the side walls 25 and 26 is preferably substantially filled with the grease.

The cover thus acts to protect the bearing from impact, moisture, dust and other contaminants and sunlight which can otherwise cause significant degradation of the bearing, the shaft and the supporting elements.

In an alternative arrangement (not shown) the cover can be provided with a filling nipple of conventional type for insertion of grease on a routine maintenance basis. In a further alternative (not shown) the simple opening 34 can be increased in size and provided with an insert seal arrangement separate from the cover and carried by the cover so as to engage the shaft and prevent more effectively the escape of grease and the entry of contaminants.

The clearance between the side walls 25 and 26 and the adjacent end face of the bearing is preferably at least 1/16th inch which is sufficient to receive a sufficient amount of grease to prevent the expansion and contraction causing the pumping of contaminants into the cover and subsequently into the bearing.

Turning now to FIGS. 6 through 9 there is shown an alternative construction of bearing of the type in which a shaft 40 is mounted for rotation and carried relative to a pair of plates 41 and 42 with an opening therein through which the shaft 40 passes. In this case each of the plates is deformed to form a cup portion 43, 44 for the outer race 45 of a bearing assembly 46. The bearing assembly includes an inner race 47 and balls 48. The inner race 47 is attached to the shaft 40 for rotation therewith. The outer race 45 is carried in the cup shaped element defined by the defamation of the plates 41 and 42. A bearing arrangement of this type is well known and is used in many locations on many different types of machine.

Figure 7:
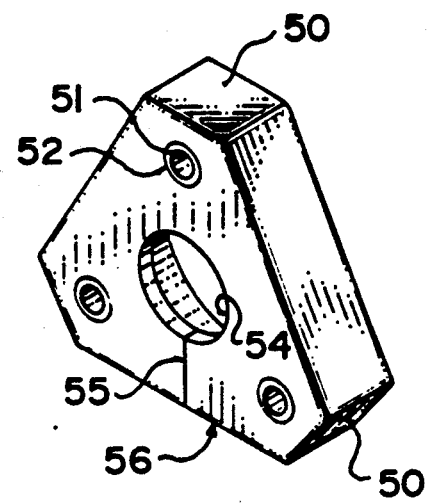
FIG. 7 is an isometric view of the cover of FIG. 6.
Figure 8:
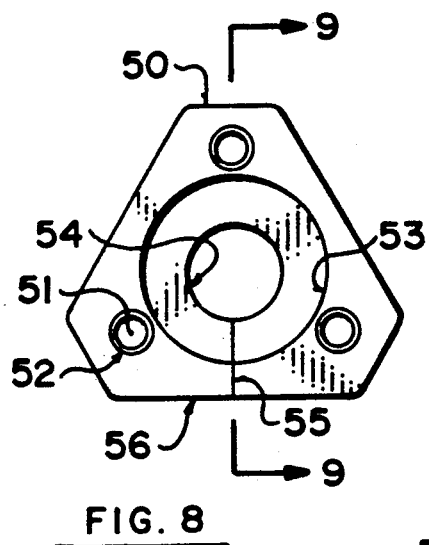
FIG. 8 is a rear elevational view of the cover of FIG. 6.

In this case the cover arrangement is formed in two parts each of which is substantially of the shape shown in FIGS. 6, 7 and 8. In this case the outer shape of the device is substantially triangular with the apexes 50 chamfered thus forming an irregular hexagon. At each of the apexes is drilled an opening 51 extending axially of the cover part. The opening receives a metal sleeve 52 for reinforcement of the part and extending through the full thickness of the part. Centrally of the part is formed a counter bore 53 of an outside diameter substantially equal to the outside of the cup defined in the plates 41 and 42. An opening 54 coaxial to the bore 53 extends through the end wall of the part defined by the bore 53. As in the previous embodiment, a slit 55 extends from the opening 54 through to one edge 56 of the part.

Figure 9:
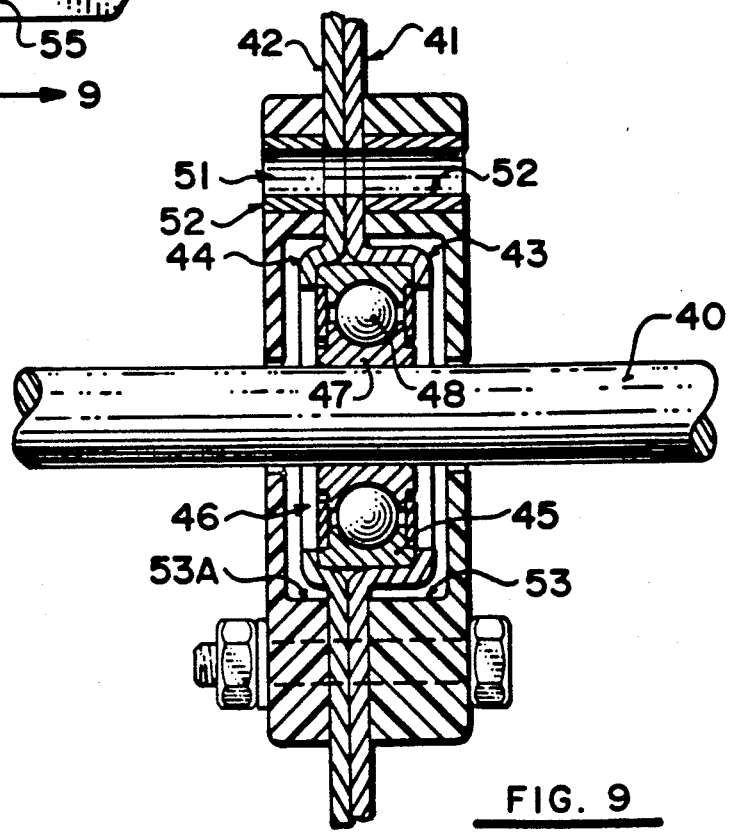
FIG. 9 is a cross sectional view along the lines 9—9 of FIG. 8 showing an additional bearing construction.

As shown in FIG. 9 the two parts are slightly different in that one is thicker than the other thus defining a bore 53 of one which is deeper than the bore 53A of the other part. This arrangement accommodates the asymmetry in the cup shaped elements 43 and 44 of the plates 41 and 42 respectively.

In operation the conventional bolts holding together the plates 41 and 42 at three positions surrounding the bearing are removed and the cover parts located in position by twisting of the part about the slit 55 to allow it to pass over the shaft 40. The parts are then moved into position on respective sides of the bearing so that the bearing is cupped within the bore 53 and the bore 53A of the second part. The metal sleeves 52 then abutt up against the outer surface of the plates 41 and 42 with the opening 51 aligned with the conventional opening in the plates. At this position bolts of increased length can be inserted through the openings 51 to clamp the cover against the plates thus providing a compressing action on the plates holding the plates together and the bearing in place. The sleeves prevent compression of the plastic molded member so that it is prevented from distorting under the compressive action of the screw fastener.

As previously described the cover can be filled with grease to maintain the bearing fully covered and protected.

An alternative arrangement (not shown) the exterior shape and the location of the openings 51 is modified so that four such openings can be provided in a body which is substantially rectangular in end elevation.

In a yet further embodiment (not shown) for use with bearings mounted at the end of the shaft where there is no shaft projecting outwardly, the opening 54 and the slit 55 can be omitted and the cover simply clamped over the end of the shaft by bolts passing through the part and into the conventional mounting arrangement of the bearing.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A bearing and cover combination comprising a shaft, a support member, a bearing comprising an inner bearing element mounted on the shaft for rotation therewith, an outer bearing element having an outer peripheral surface and defining an annular chamber between the inner and outer bearing elements and having end faces of the chamber at axially facing end faces of the bearing, and bearing means mounted in the chamber for supporting the inner element relative to the outer element for rotation relative thereto, means mounting the outer bearing element in fixed position on the support element for rotation of the shaft relative to the support element and sealing means fully enclosing and substantially sealing the bearing from exposure to the environment, said sealing means including a cover element for the bearing comprising an integrally molded plastics body defining at least an end wall portion covering one of said end faces of said bearing and a peripheral wall portion covering the outer peripheral surface of the outer element, said cover element having means thereon engaging the support element to hold said cover element on said bearing.

2. The combination according to claim 1 wherein the plastics material is a flexible polypropylene.

3. The combination according to claim 1 wherein the end wall portion includes an opening therein surrounding the shaft and wherein the end wall portion is cut from one edge of the end wall portion to the opening to allow the plastics body to be engaged around the shaft.

4. The combination according to claim 3 wherein the cut is formed as a slit of the material so that all of the material remains intact for a closing of the slit when the cover is engaged around the shaft.

5. The combination according to claim 4 wherein the slit lies in an axial plane.

6. The combination according to claim 1 wherein the end wall portion and the peripheral wall portion are spaced from the underlying portions of the bearing and wherein said engaging means forms a tight compacting fit with the support element.

7. The combination according to claim 6 wherein there is at least 1/16th inch clearance between the peripheral wall portion and the end wall portion and the underlying portions of the bearing.

8. The combination according to claim 7 wherein the clearance is filled with grease..

9. The combination according to claim 1 wherein the support member comprises a pillow block engaged against a plate of a support frame, the pillow block including a part cylindrical upper wall and a pair of flanges projecting outwardly from a lower part of the support member at right angles to the shaft, the cover element including a part cylindrical upper wall surrounding an axis of the bearing, a pair of parallel side faces at right angles to the axis, each side face having an opening therein concentric to the axis for receiving the shaft, a pair of end walls spaced outwardly from the part cylindrical wall in a direction at right angles to the axis with each end wall lying in a plane parallel to the axis, a pair of upper wall portions each extending from the part cylindrical wall to a respective one of the end walls, an underside of the cover element being open to expose a hollow interior thereof for pressing over the pillow block and means defining a pair of slots each extending from the underside to a respective one of the openings.

10. The combination according to claim 9 wherein each of the side walls has an inside wall surface defining a recess at a position thereon aligned with the bearing such that the inside wall surface lies substantially in contact with the pillow block at positions thereon spaced from the bearing and there is defined a clearance between the inside wall surface and the bearing for receiving lubricant material.

11. The combination according to claim 1 wherein the support member comprises a first plate member and a second plate member clamped together in substantially parallel contacting relationship so as to engage the outer bearing member therebetween in a recess therein surrounding the shaft, the cover element comprising a first portion mounted on one side of one of the plate members and a second portion mounted on one side of the other of the plate members so as to clamp the plate members therebetween, each of the portions having an opening therein for surrounding the shaft a slot extending from the opening to one outside edge of the part and a plurality of openings therethrough for receiving clamping fasteners therethrough.

12. The combination according to claim 11 wherein each of the parts is formed from a flexible plastics material and wherein there is provided a rigid insert in each of the openings for communication of force in a direction parallel to the opening to clamp said plate members together.

13. A cover member for a pillow block bearing arrangement comprising an integrally molded plastics body defining a part cylindrical upper wall surrounding an axis of the bearing, a pair of parallel side faces at right angles to the axis, each side face having an opening therein concentric to the axis for receiving a shaft of the bearing arrangement, a pair of end walls spaced outwardly from the part cylindrical wall in a direction at right angles to the axis with each end wall lying in a plane parallel to the axis, a pair of upper wall portions each extending from the part cylindrical wall to a respective one of the end walls, an underside of the cover element being open to expose a hollow interior thereof for pressing over the pillow block bearing arrangement and means defining a pair of cuts each extending from the underside to a respective one of the openings.

14. The cover member according to claim 13 wherein the plastics material is a flexible polypropylene.

15. The cover member according to claim 13 wherein each cut is formed as a slit of the material so that all of the material remains intact for a closing of the slit when the cover is engaged around the shaft.

16. The cover member according to claim 15 wherein the slit lies in an axial plane.

* * * * *